(12) United States Patent
Rothermel et al.

(10) Patent No.: US 6,614,607 B1
(45) Date of Patent: Sep. 2, 2003

(54) SERVO PATTERN RECORDING METHOD AND SYSTEM

(75) Inventors: Stephen J. Rothermel, Roseville, MN (US); Robert P. Groschen, Jr., Rochester, MN (US); Curtis B. Hause, St. Paul, MN (US); Richard E. Jewett, Minneapolis, MN (US); Steven C. Weber, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/474,358

(22) Filed: Dec. 29, 1999

(51) Int. Cl.[7] .................................................. G11B 5/09
(52) U.S. Cl. ....................................... 360/48; 360/77.12
(58) Field of Search ........................... 360/77.12, 78.02, 360/66, 48, 46

(56) References Cited

U.S. PATENT DOCUMENTS

| | | | |
|---|---|---|---|
| 4,318,141 A | | 3/1982 | Haynes ........................ 360/77 |
| 4,433,349 A | * | 2/1984 | Kimura ........................ 360/31 |
| 5,101,309 A | * | 3/1992 | Mitsuhashi ................... 360/31 |
| 5,448,430 A | * | 9/1995 | Bailey et al. ............ 360/77.01 |
| 6,239,932 B1 | * | 5/2001 | Hoogendoorn ............... 360/64 |

FOREIGN PATENT DOCUMENTS

| | | |
|---|---|---|
| WO | WO 96/30897 | 10/1996 |

* cited by examiner

*Primary Examiner*—David Hudspeth
*Assistant Examiner*—Varsha A Kapadia
(74) *Attorney, Agent, or Firm*—Eric D. Levinson

(57) ABSTRACT

Bias recording is used to record servo patterns on magnetic tape. With use of bias recording, a faster recording process may be provided relative to conventional pulse recording processes. A servo pattern recording method includes providing a servo band along at least a portion of a length of a tape. Bursts of a first signal are recorded in a first servo track of the servo band along the length of the tape and a second signal, e.g., a continuous signal, is recorded in at least a second servo track of the servo band along the length of the tape. The second servo track is recorded adjacent to the first servo track and at least one of the first signal and the second signal is recorded using a bias signal at a bias frequency summed with a record signal at a record frequency. A system for carrying out the bias recording of servo patterns is also described.

26 Claims, 8 Drawing Sheets

SERVO PATTERN RECORDING METHOD AND SYSTEM

FIELD OF THE INVENTION

The present invention relates to magnetic tape data storage. More particularly, the present invention relates to recording methods and systems for recording servo patterns on magnetic tape.

BACKGROUND OF THE INVENTION

It is common to provide magnetic tape write/read head assemblies having one or more write/read transducer elements positioned transverse to the intended path of a magnetic recording medium, e.g., tape, for writing data on and reading data from parallel tracks on the tape. It is also known to include servo information on at least some of the parallel tracks and provide servo transducer elements on the recording/playback head for reading such information to enable control of the lateral position of the head assembly, thereby dynamically maintaining the respective transducer elements of the head assembly relative to tape track. With the use of servo control, data track widths can be made significantly narrower and the data capacity of the recording medium can therefore be increased.

Various techniques for providing servo tracks have been previously employed. For example, it is known to provide dedicated servo tracks on the medium at the time of manufacture, e.g., pulse recording servo information in the factory.

There are a substantial number of different servo track configurations for providing servo control. For example, one such servo pattern is described in U.S. Pat. No. 5,448,430 to Bailey, et al., entitled "Track Following Servo Demodulation," issued Sep. 5, 1995, which is useable with an IBM 3590 magnetic tape subsystem for writing/reading data to/from magnetic tape. As described therein, the servo pattern includes multiple servo areas which each include two outer tracks having a recorded servo pattern of one frequency located on either side of a middle track which has a different recorded servo pattern of a second frequency. Such a servo pattern attempts to minimize errors in the writing/reading of data to/from magnetic tape by effectively positioning a multi-track magnetic tape head relative to such magnetic tape. Conventionally, such servo patterns have been written utilizing pulse recording processes. In such processes, pulse generation circuits are used to generate write currents for driving servo writers to write servo patterns on the magnetic tape.

Pulse recording processes tend to require a relatively large bandwidth in the write driver used to generate drive currents for driving write elements to pulse record servo patterns. As such, the pulse recording process of servo information in servo tracks on magnetic tape tends to be relatively slow. With large quantities of magnetic tape being written in a factory, such slow servo recording rates are undesirable.

Further, generally, servo recording requires optimization of servo track positioning, e.g., the positioning of one or more servo track edges as perceived by a servo read head. Such servo track positioning is dependent on various factors, including, but clearly not limited to, actual physical servo track position, magnetization of the servo tracks by the recording fields, and spacing loss between servo record/read heads and the tape. In many servo recording techniques, it is difficult to compensate for variations with respect to such factors. As such, additional techniques to record servo tracks to provide some compensation for such variations are needed.

SUMMARY OF THE INVENTION

The present invention uses bias recording to record servo patterns on magnetic tape. With use of bias recording, a faster recording process is provided relative to conventional pulse recording processes.

A servo pattern recording method according to the present invention includes providing a servo band along at least a portion of a length of a tape. Bursts of a first signal are recorded in a first servo track of the servo band along the length of the tape and a second signal, e.g., a continuous signal, is recorded in at least a second servo track of the servo band along the length of the tape. The second servo track is recorded adjacent to the first servo track and at least one of the first signal and the second signal is recorded using a bias signal at a bias frequency summed with a record signal at a record frequency.

In one embodiment of the method, recording of the bursts in the first servo track includes recording the bursts using a first bias signal, e.g., a continuous signal, at a first bias frequency summed with bursts of a first record signal at a first record frequency and recording the second signal in at least the second servo track includes recording the second signal using a second bias signal at a second bias frequency summed with a second record signal at a second record frequency.

In another embodiment of the method, the method includes recording the bursts in the first servo track by driving a first write element in a first position with a first servo track write current that is a summation of a first servo track bias current and a first servo track record current. In a like manner, recording a continuous second signal in at least the second servo track includes driving a second write element in a second position with a second servo track write current that is a summation of a second servo track bias current and a second servo track record current.

Another servo pattern recording method according to the present invention includes providing at least one servo band along at least a portion of a length of a tape. Bursts of a first signal are recorded in an inboard servo track of the servo band using an inboard bias signal at an inboard bias frequency summed with bursts of an inboard record signal at an inboard record frequency. A continuous second signal is recorded in each of a first and second outboard servo track of the servo band. Each continuous second signal is recorded using an outboard bias signal at an outboard bias frequency summed with an outboard record signal at an outboard record frequency. The first outboard servo track is adjacent a first edge of the inboard servo track along the length of the tape and the second outboard servo track is adjacent a second edge of the inboard servo track along the length of the tape.

In one embodiment of the method, recording the bursts of the first signal in the inboard servo track includes driving a first write element with an inboard current that is a summation of an inboard bias current and an inboard record current. Likewise, recording the continuous second signal in each of the first and second outboard servo tracks includes driving second write elements with outboard currents that are a summation of an outboard bias current and an outboard record current.

In another embodiment of the method, the method includes determining the inboard and outboard bias currents by measuring servo read output amplitude for a plurality of servo patterns written using a plurality of bias currents with the other currents set to predetermined current levels. The bias currents are selected as a function of peak servo read output amplitude of the measured servo read output amplitudes.

In yet another embodiment of the method, the method includes determining the outboard record current as a function of a target servo read output amplitude. Further, the inboard record current may be determined as a function of a target inboard servo track width.

A servo pattern recording system for recording a servo pattern in at least one servo band along at least a portion of a length of a tape is also described. The system includes apparatus for recording bursts of a first signal in a first servo track of the servo band along the length of the tape and apparatus for recording a second signal, e.g., a continuous signal, in at least a second servo track of the servo band along the length of the tape. The second servo track is recorded adjacent to the first servo track and at least one of the first signal and the second signal is recorded using a bias signal at a bias frequency summed with a record signal at a record frequency.

In one embodiment, the apparatus for recording the bursts in the first servo track records the bursts using a first bias signal at a first bias frequency summed with bursts of a first record signal at a first record frequency. Further, the apparatus for recording the second signal in at least the second servo track records the second signal using a second bias signal at a second bias frequency summed with a second record signal at a second record frequency.

Another servo pattern recording system according to the present invention includes one or more write elements; a bias frequency generator operable to generate at least one bias frequency signal; an inboard frequency generator operable to generate at least one inboard frequency signal; an outboard frequency generator operable to generate at least one outboard frequency signal; amplitude control circuitry operable to modify the amplitude of the at least one bias frequency signal, the at least one inboard frequency signal, and the at least one outboard frequency signal; and burst control logic circuitry connected to the inboard frequency generator to provide for burst inboard frequency signals therefrom.

Control circuitry is operable to control the application of a bias frequency signal modified by the amplitude control circuitry and the application of burst inboard frequency signals modified by the amplitude control circuitry to at least a first output drive circuit to drive at least one of the write elements to record bursts of a first signal in an inboard servo track of at least one servo band along at least a portion of a length of a tape. Further, the control circuitry is operable to control the application of a bias frequency signal modified by the amplitude control circuitry and the application of an outboard frequency signal modified by the amplitude control circuitry to at least a second output drive circuit to drive at least one of the write elements to record a continuous second signal in first and second outboard servo tracks of the servo band. The first outboard servo track is adjacent a first edge of the inboard servo track along the length of the tape and the second outboard servo track is adjacent a second edge of the inboard servo track along the length of the tape.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF THE PREFERRED EMBODIMENTS

Figure 1:
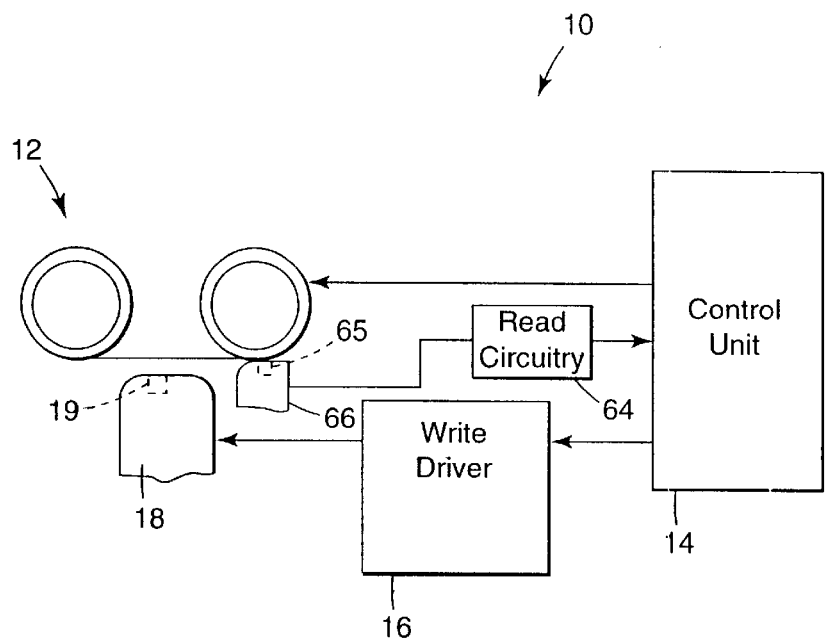
FIG. 1 is an illustrative block diagram of a tape servo recording system in accordance with the present invention.

FIG. 1 is a general block diagram of an illustrative tape servo recording system 10 according to the present invention. The tape servo recording system 10 includes a control unit 14 that controls a write driver 16 which drives one or more write elements 19, and optionally one or more erase elements (not shown), of a write head 18 for recording a servo pattern on a magnetic tape 12. Further, the tape servo recording system 10 includes servo read circuitry 64 and a servo read head 66 having one or more servo read elements 65 for use in verifying conformance of recorded servo tracks to desired drive system requirements for such recorded tracks.

Control unit 14 is interconnected with various devices, such as computer devices for management of information required to perform a servo recording function according to the present invention. Generally, the control unit 14 is a processor based unit for receiving data and generating control signals for use in performing read and write features. For example, the control unit 14 is interconnected with devices such as tape reel motors, capstan motors, vacuum columns, and tachometers to control the direction, velocity, and acceleration of the magnetic tape 12.

Generally, the servo pattern recorded according to the present invention includes at least two servo tracks each recorded with a different signal. Bias recording may be used to record the different signals in either one or both of the two servo tracks. Preferably, at least bursts of a first signal are bias recorded in one of the servo tracks. More preferably, bursts of a first signal are bias recorded in one of the servo tracks and a continuous second signal is bias recorded in at least one other adjacent servo track.

Figure 2:
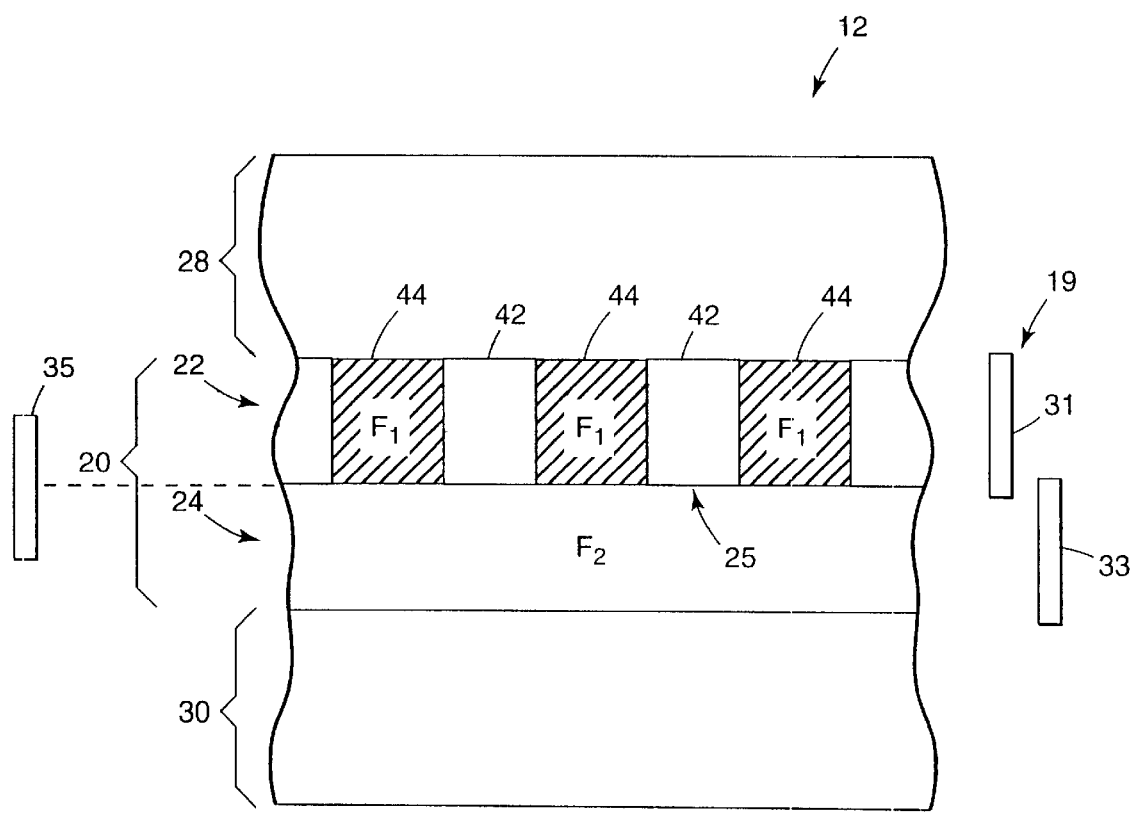
FIG. 2 is a generalized illustrative servo pattern recorded on a magnetic tape according to the present invention.

A generalized illustrative servo pattern recorded on magnetic tape 12 by tape servo record system 10 is shown in FIG. 2. FIG. 2 shows a portion of a tape including the servo pattern recorded thereon. The portion of the tape 12 as shown in FIG. 2 includes a servo band 20 extending in the longitudinal direction along the length of the tape.

In the servo band 20 are recorded at least a first servo track 22 and a second servo track 24. In addition to the servo tracks 22, 24 of servo band 20, data bands 28, 30 are also shown on tape 12. One skilled in the art will recognize that the data bands may take various configurations and that a varied number of data bands and servo bands may be used and arranged across the width of a magnetic tape 12. Preferably, data tracks of the data bands and servo tracks of the servo bands are parallel tracks extending along the length of the tape. Also preferably, the servo tracks 22 and 24 are adjacent one another. As used herein, when servo tracks are described as being adjacent to one another, either one servo track may overwrite at least a portion of another servo track or one servo track may be spaced from another servo track by a space much less than the servo track width; so long as the overlap or spacing does not affect the reading of the servo information recorded therein.

According to the present invention, preferably, all the servo tracks of the servo pattern in servo band 20 are recorded using a bias recording process. Bias recording uses a bias signal to saturate the magnetic tape summed with a record signal that contains the information to be recorded on the media. Both the bias and record signals are recorded on the tape. A read system may then recover and process the recorded signal.

Preferably, according to the present invention, servo band 20 has bias recorded therein the first servo track 22 and the second servo track 24 extending in a parallel manner along the length of the tape in the servo band 20. Further, preferably, the first servo track 22 and the second servo track 24 are adjacent one another with a servo track edge 25 defined at the interface between the first and second servo tracks 22, 24.

Preferably, prior to recording the first and second servo tracks 22, 24, the servo band 20 of magnetic tape 12 is erased. For example, the servo band 20 may be erased by an erase element (not shown) on write head 18 under control of control unit 14 during a servo record process or may be bulk erased as would be readily known to one skilled in the art. The erase process is performed at a predetermined erase frequency.

With servo band 20 optionally erased, bursts of a first signal are recorded in first servo track 22 along the length of the tape 12 resulting in alternating erased portions 42 and burst portions 44 (F1). According to the present invention, the bursts are recorded using a bias signal at a predetermined bias frequency summed with a record signal at a predetermined record frequency. Preferably, the bursts are recorded using a continuous bias signal at a predetermined bias frequency summed with bursts of a record signal at a predetermined record frequency. Further, the bursts are relatively short and are shorter than the width of the magnetic tape, e.g., 12 mm. For example, preferably the bursts have a burst length in the range of about 0.01 mm to about 1.0 mm, and are spaced in the range of about 0.02 mm to about 2.0 mm.

Further, according to the present invention, a continuous second signal (F2) is recorded in the second servo track 24 along the length of the tape 12 in the servo band 20. The recording of a continuous second signal (F2) is performed using a bias signal at a predetermined bias frequency summed with a record signal at a predetermined record frequency. The signal recorded in the second track need not be continuous, but could be some other type of signal such as another burst signal, a periodically recorded signal, or any other signal that would provide suitable servo information in the servo track.

It will be recognized that the sequence of the description herein does not indicate which servo track is recorded first. For example, preferably, the bursts of the first signal (F1) are recorded following the recording of the continuous second signal (F2).

The first servo track 22 is recorded by driving a write element 31 of the one or more write elements 19 of write head 18 using write driver 16 under control of control unit 14. The write element 31 is driven using a servo track write current that is a summation of a bias current and a record current. Preferably, the record current used for driving the write element 31 is gated on/off to obtain a desirable duty cycle for the bursts, while the bias current remains on continuously to provide the erased portions 42 between the burst portions 44. Further, second servo track 24 is recorded by driving write element 33 of the one or more write elements 19 of write head 18 using write driver 16 under control of control unit 14. The continuous second signal in the second servo track 24 is recorded by driving the write element 33 using a servo track write current that is a summation of a bias current and a record current. The write elements 31, 33 are provided along separate gap lines of the head 18 as diagrammatically shown in FIG. 2.

Generally, the bias currents used to drive the write elements 31, 33 are determined by measuring servo read output amplitude (e.g., measured by reading the servo pattern using a suitable servo read system such as that described with reference to FIG. 6, except with a stationary read element 35 aligned substantially with edge 25) for a predetermined number of servo patterns written using a corresponding number of bias currents with the record currents set to predetermined current levels. Then, generally, the bias currents are selected as a function of the peak output amplitude of the measured servo read output amplitudes. In other words, for example, the bias current for recording servo track 22 and the bias current for recording servo track 24 may be set slightly over the bias current that yields peak amplitude with record currents that are set to typical operating levels.

Further, generally, the record current used to drive the write element 33 for recording the continuous second signal in second servo track 24 is determined as a function of a target servo read output amplitude for the signal recorded in the second servo track 24. For example, the record current used to drive the write element 33 may be determined by measuring the servo read output amplitude using a suitable servo read system for a predetermined number of servo patterns written using a corresponding plurality of record currents with the bias currents for recording the servo tracks 22, 24 and the record current for recording servo track 22 set to predetermined current levels. Thereafter, the record current used in driving the write element 33 is selected as a function of the measured servo read output amplitudes compared to the target servo read output amplitude.

Yet further, generally, the record current used to drive write element 31 to record the bursts in the first servo track 22 is determined as a function of a target position of at least one servo track edge, e.g., servo track edge 25 defined by the servo tracks 22, 24 in the servo band 20 on the tape 120, as perceived by a servo read head, e.g., servo read head 35, with the servo read head in a fixed position substantially aligned with the servo track edge 25. For example, the servo track edge position of the servo track edge 25 may be measured for a predetermined number of servo patterns written using a corresponding plurality of record currents for driving write element 31 with the record current used for recording servo track 24 and the bias currents for recording the servo tracks 22, 24 set at predetermined current levels.

The position of the servo track edge 25 for each of the plurality of servo patterns can be measured as a function of the amplitude of the servo signal of the bursts in servo track 22 and the signal in servo track 24 as read by the servo read head 35, with the servo read head in a fixed position substantially aligned with the servo track edge 25. For example, the amplitudes read by the servo read element 35 for the plurality of servo patterns can be used with a look up table to provide positions of the servo track edge 25 as perceived by the servo read head 35. It will be noted that the position measured is not the actual physical position of the servo track edge relative to the read head, but rather is the perceived position of the servo track edge 25 measured as a function of the amplitude of signal at the read head 35. The record current for driving the write element 31 is then selected as a function of the measured positions compared to the target servo track edge position desired. It will be recognized from the description below with reference to the embodiment of FIG. 4, that if target positions of two servo track edges are used, then the target positions can be equated to a target track width as further described below.

Under control of the control unit 14, write driver 16 implements the generation of the summed bias and record currents determined for driving the respective write elements 31, 33. As such, the servo tracks 22, 24 can be bias recorded.

Bias recording of servo tracks is advantageous for various reasons. For example, bias recording allows for higher speed recording of such servo tracks, allows for increased track width adjustment ranges, and may reduce servo error rates when compared to conventional recording methods of servos, e.g., pulse recording. With respect to the advantage of higher speed operation, such higher recording speeds are obtained because bias recording requires less bandwidth in the write driver 16 and write head 18 than other methods of recording. For example, bias recording signals may use a sine wave for the bias signal which requires less bandwidth than a series of pulses, such as in pulse servo recording, thus making high speed operation easier to achieve.

The advantages of bias recording servo patterns and the process for determining the bias and record currents used in bias recording of such servo patterns will become clear from the illustrative embodiment described below for recording a servo pattern for a 3590 magnetic tape cartridge, such as those available from Imation and IBM. Such a servo pattern is generally described in ANSI® specification entitled "American National Standard for Information Technology—Magnetic Tape and Cartridge for Information Interchange—Unrecorded, 128-track, Parallel Serpentine, 12.65 mm (½ in), 2550 ftpmm (64 770 ftpi)," approved Jul. 27, 1998. Further, such a servo pattern is generally described herein and is also described in U.S. Pat. No. 5,448,430 to Bailey et al., entitled "Track Following Servo Demodulation," issued Sep. 5, 1995.

However, one skilled in the art will recognize that other servo configurations may be recorded in this manner with specific advantages as described herein where such a servo pattern includes the recording of at least one servo track with bursts of a first signal (F1) recorded therein. Further, preferably, another adjacent servo track has a continuous second signal (F2), as generally described with reference to FIG. 2, also bias recorded therein. For example, such a servo pattern may include more than one servo band with servo tracks written therein, one servo band may include more than two servo tracks written therein such as in the case of the 3590 including an inboard track with two adjacent outboard servo tracks as described further below, such a servo pattern may include multiple servo bands with each servo band including two servo tracks therein, or may include any other servo pattern that may benefit from the bias recording of the servo information in the servo tracks.

Figure 3:
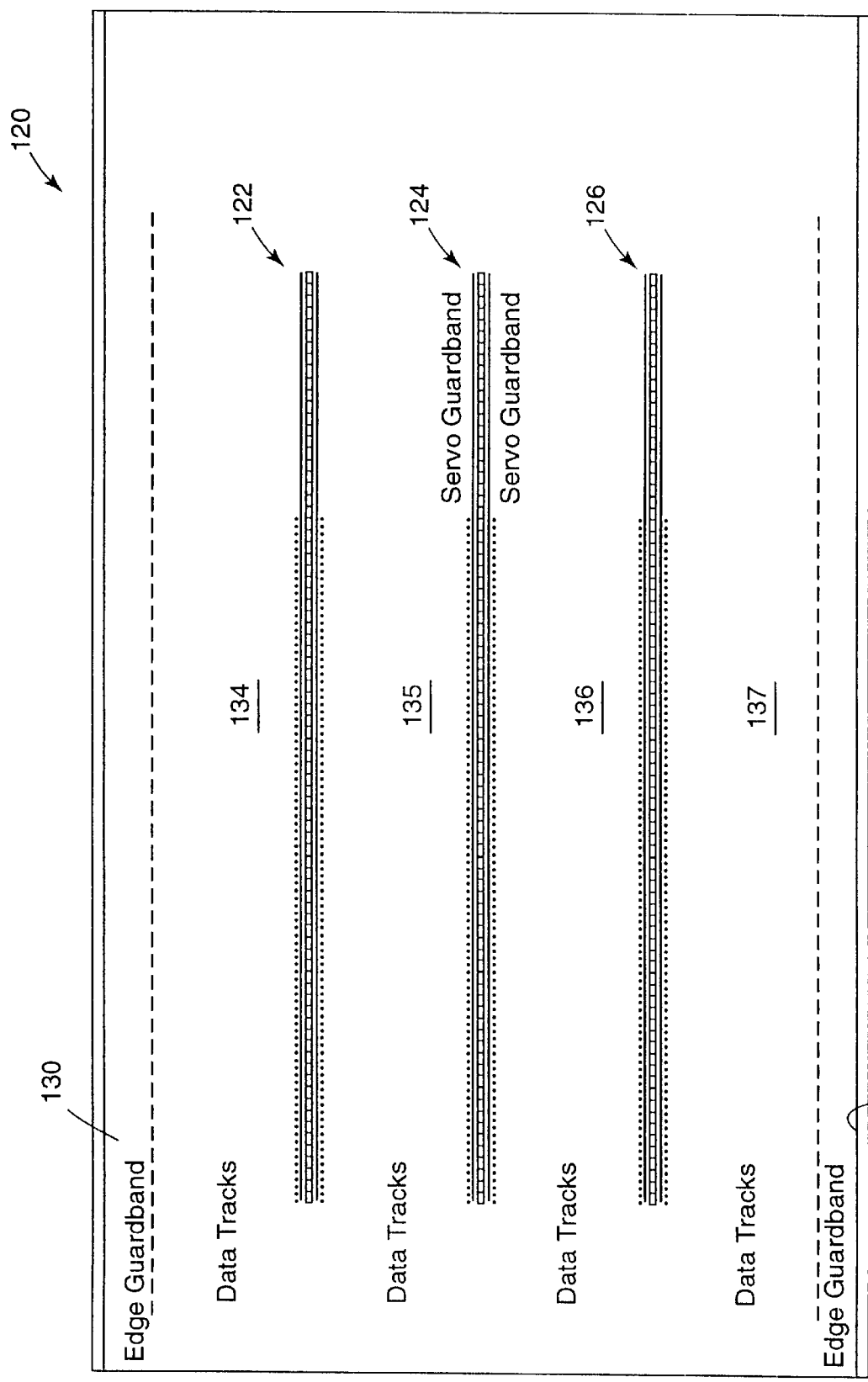
FIG. 3 is an illustrative diagram of a magnetic tape format employed according to the present invention.

FIG. 3 illustrates a format of a magnetic tape 120 having an illustrative servo pattern which is recordable according to the present invention. For example, the magnetic tape 120 may be of a 3590 magnetic tape cartridge. The format of the magnetic tape 120 includes four data track groups 134–137 and three parallel servo bands 122, 124, 126 symmetrically spaced across the tape width between the four data track groups 134–137. For example, the three servo bands may be spaced 2855 µm apart. The data track groups 134–137 and the servo bands 122, 124, 126 extend longitudinally along the length of the tape 120. Guard bands 130, 132 are situated between the tape edges and the first and last data tracks of data track groups 134, 137, respectively.

Figure 4:
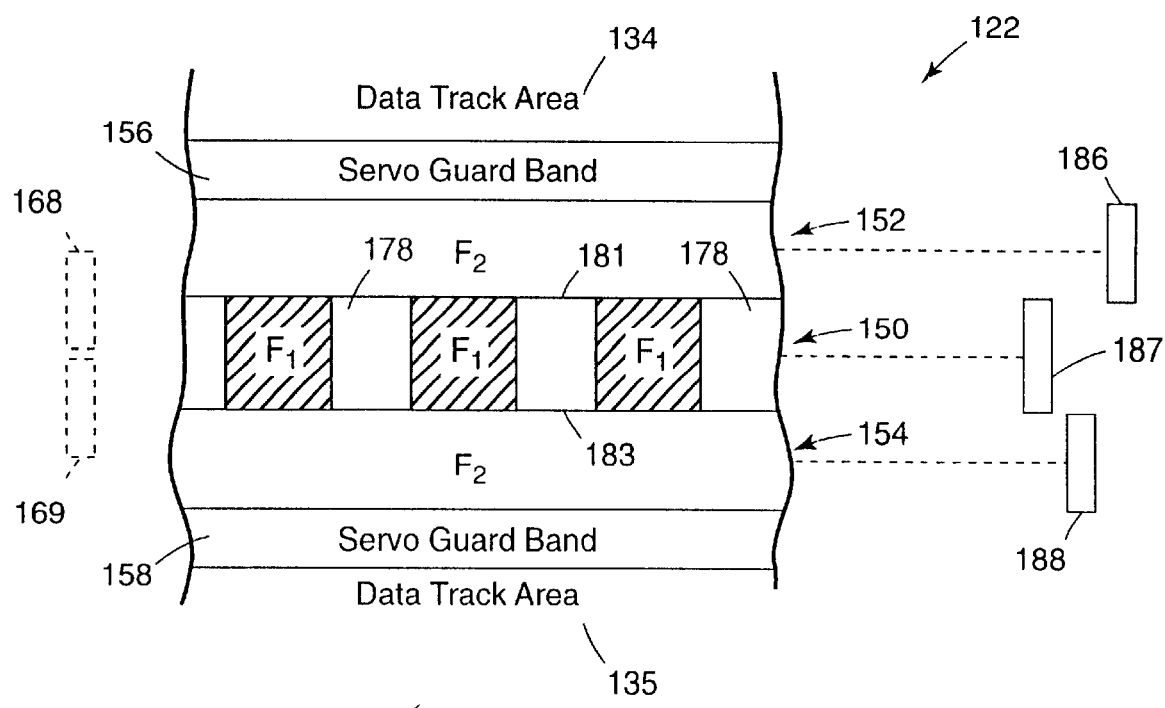
FIG. 4 illustrates one servo band of the magnetic tape format shown in FIG. 3.

Servo band 122, which is substantially the same as servo bands 124 and 126, is shown in further detail in FIG. 4. Each of the servo bands 122, 124, 126 include associated servo guard bands, such as servo guard bands 156 and 158 shown in FIG. 4 which separate the servo band 122 from adjacent data tracks in data track groups 134 and 135. Only servo band 122 shall be described in detail as it is clearly representative of the other servo bands 124, 126.

Servo band 122 which extends longitudinally along the length of the tape 120 includes an inboard servo track 150 having bursts of a first signal (F1) recorded therein and two outboard servo tracks 152, 154 having a continuous second signal (F2) recorded therein. For example, the two outboard servo tracks 152, 154 may be about 60 µm wide and be adjacent an 80 µm wide inboard servo track 150. The outboard servo tracks 152, 154 of the servo band 122 are bias recorded with the continuous second signal (F2) having a predetermined amplitude. The inboard servo track 150 is recorded with a repetitive pattern in which a first signal (F1), having a different density than the signal (F2) and having a predetermined amplitude, alternates with a portion having zero amplitude (also referred to as a null or erase portion 178).

In order to write the inboard servo track 150 and outboard servo tracks 152, 154, a determination of the drive currents desired to drive write elements 186–189 (shown diagrammatically in FIG. 4 along separate gap lines) for recording the inboard and outboard servo tracks must be performed. For example, drive write elements 186–189 may be part of a write head and a tape servo recording system like that shown in FIG. 1.

As previously indicated, to record a servo track using bias recording, a bias signal is summed with a record signal for recordation of a servo signal in servo band 122. Therefore, to record the inboard servo track 150, an inboard bias current and an inboard record current must be determined to drive a write element 187 to write the servo information in inboard servo track 150. Likewise, to write servo information in outboard servo tracks 152, 154, an outboard bias current and an outboard record current must be determined to drive the write elements 186, 188. Such outboard bias and outboard record currents are preferably determined separately for recording in the upper outboard servo track 152 and lower outboard servo track 154 as further described herein. However, a single set of bias recording currents could be determined for use to record in both upper and lower servo tracks. Further, the present description with regard to the determination of bias recording currents will be with respect to the servo band 122. However, one skilled in the art will recognize that such bias recording currents may be used for the other servo bands also, or that other bias recording currents may be determined for bias recording in such servo bands, e.g., servo bands 124, 126.

Bias recording frequencies must also be chosen for recording the inboard servo track 150 and outboard servo tracks 152, 154. Generally, the operating frequencies may be any frequencies which may be detected by a servo read system such as a system that is part of a drive unit or servo read circuitry described below with reference to FIG. 6. Preferably, the inboard bias frequency of the bias signal used to record inboard servo track 150 is higher than the inboard record frequency of the record signal used to record servo information in the inboard servo track 150 and outside the filter 72 (see FIG. 6) pass band. Likewise, preferably, the outboard bias frequency of the bias signal used to record outboard servo tracks 152, 154 is of a higher frequency than the outboard record frequency of the outboard record signal used to record such tracks and outside the filter 72 (see FIG. 6) pass band.

In addition, the amplitude of the inboard bias signal is generally greater than the amplitude of the inboard record signal. Likewise, the amplitude of the outboard bias signal is generally greater than the amplitude of the outboard record signal.

For example, when writing a servo pattern such as for the IBM 3590, a 12.750 megahertz (MHz) sine wave bias signal may be used at 5 m/s, recording a 0.39216 $\mu$m wavelength. A 2.1250 MHz sine wave outboard record signal may be used, recording a 2.3530 $\mu$m wavelength in the outboard servo tracks 152, 154. A 2.9423 MHz sine wave inboard record signal may be used, recording a 1.6994 $\mu$m wavelength on the inboard servo track 150. Further, the inboard record signal may be turned on and off at a predetermined rate to achieve the alternating erased portions and F1 signal portions. For example, the inboard record signal may be turned off at a 15.089 kHz burst rate for a 331.37 $\mu$m burst length to record the inboard servo track for a IBM 3590 servo pattern. The inboard record signal may have a duty cycle of 0.49231.

Yet further, preferably, the bias frequency such as for recording a servo pattern for the IBM 3590 is selected to match the erase frequency for the IBM 3590. The outboard and inboard record signal frequencies match the fundamental frequencies of the respective 3590 signals. The burst rate and duty cycle match the corresponding 3590 rate and duty cycle.

With the operating frequencies set, determination of the drive currents required to drive write elements 186–188 for bias recording of the servo pattern on tape 122 shall be described with reference to the method 50 illustratively shown in FIG. 5 and with reference to the servo read circuitry 64 shown in FIG. 6.

Figure 6:
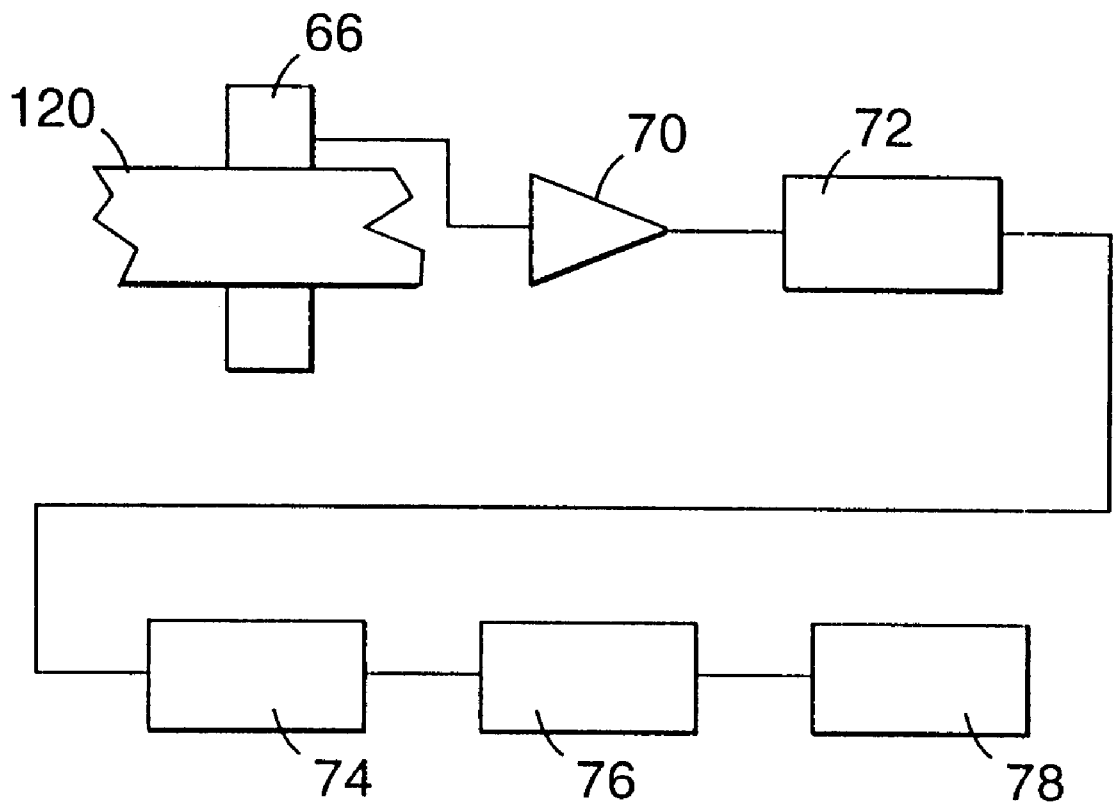
FIG. 6 is an illustrative block diagram of servo read circuitry of the tape servo recording system for use in verifying conformance of the recorded servo tracks to the desired drive system requirements.

One illustrative embodiment of servo read circuitry 64 is shown in FIG. 6 for measuring the position of the servo track edges, e.g., track edges 181, 183, on tape 120 relative to read head 66, for provide output amplitude measurements for recorded servo patterns, and for verifying conformance of the recorded servo tracks on tape 120 to desired drive system requirements. The illustrative servo read circuitry 64 receives signals from read head 66 and includes a read amplifier 70, a band pass filter 72, a verify board 74, a digital signal processor 76, and a computer 78. In operation, the servo read circuitry 64 provides for precise servo track position measurement by measuring the amplitude of signals from servo read elements 168, 169 (shown in FIG. 4) of read head 66. The servo read elements 168, 169 are aligned with an upper servo track edge 181 and a lower servo track edge 183, respectively, between the inboard servo track 150 and an outboard servo track 152, 154, respectively, of the servo band 122. Generally, the read amplifier 70 amplifies the output of the read head 66 and may also bias the read head 66. The band pass filter 72 removes substantially all but the fundamental frequencies of the signals from the inboard servo track 150 and outboard servo tracks 152, 154. The verify circuitry 74 measures the signal amplitudes coming out of the band pass filter 72 and provides these amplitude measurements to the digital signal processor 76 to calculate the position of the tape 120, and thus the servo track edges, relative to the head 66 and to check for error conditions. The digital signal processor 76 is operatively connected to computer 78 for data collection and reporting.

For example, with the read element 169 (shown in FIG. 4) aligned on a selected edge 183, generally two signals are generated as the tape 120 travels past the read head 66. The same is true with respect to read element 168 aligned on edge 181, but for sake of simplicity, only read element 169 will be described herein. A first signal amplitude is representative of the signal F2 (where F1 is equal to 0) as generated by the read element 169 when the null portion or erased portion of the inboard track 150 passes the read element 169. As such, this signal amplitude consists of only the amplitude of the outboard signal (F2). When the non-zero or F1 portions of the inboard servo track 150 passes the read element 169, a second signal amplitude consisting of the sum of the outboard and inboard signals (F1+F2) is generated.

The amplitudes of the two separate signals F1 and F2 are substantially proportional to the width of the servo read element 169 covering the respective outboard 154 and inboard tracks 150. The digital signal processor 76 calculates the position of the tape relative to the read head 66 based on the amplitude measurements. For example, when the servo read element 169 covers more of the outboard servo track 154 than the inboard servo track 150, the amplitude ratio of the F2 signal to (F1+F2) increases. Conversely, when the servo read element 169 covers more of the inboard servo track 150 than the outboard servo track 154, the amplitude ratio of the F2 signal to (F1+F2) decreases. In both situations, the amplitude of the (F1+F2) remains substantially constant. Therefore, the ratio between the amplitudes of the F2 only and (F1+F2) represents the position of the servo edge 183 relative to the servo read element 169. One skilled in the art will recognize that various configurations of servo read circuitry may be used to measure tape 120 position relative to head 66 and that the present invention is not limited to any particular servo read circuitry.

The servo read circuitry 64, as shown in FIG. 6, is illustrative of the circuitry used in the determination of drive currents for use in bias recording as described with reference to FIGS. 5 and 7A–7D, e.g., to provide servo read head output amplitudes of servo patterns written with varying bias and record currents. To effectively provide data for use in making such determinations, the two servo read elements (i.e., upper servo read head element 168 and a lower servo read head element 169 shown as dashed lines in FIG. 4) are used and fixed in a position to read along edges 181 and 183, respectively, of servo band 122.

Figure 5:
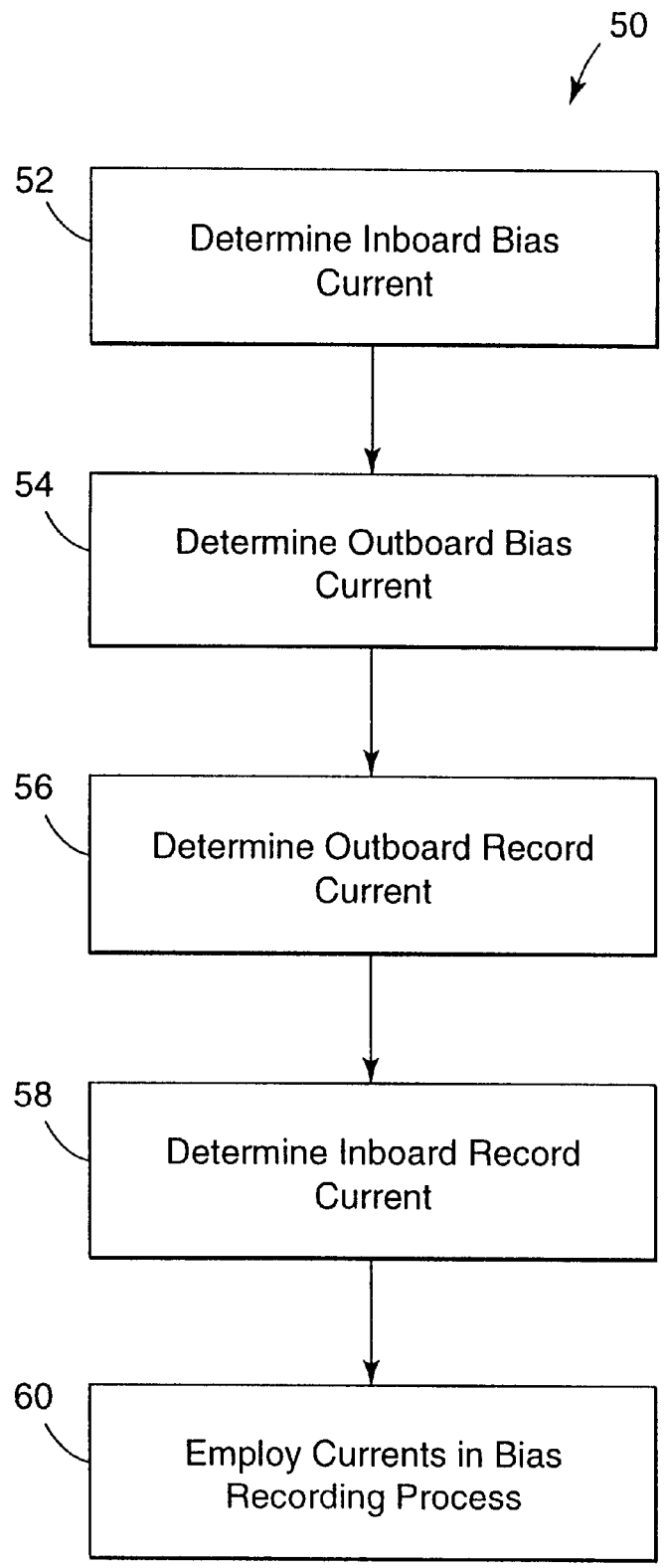
FIG. 5 is a block diagram of one embodiment of an illustrative method of determining drive currents for recording servo patterns according to the present invention.

The method, as shown in FIG. 5, of determining drive currents 50 for bias recording the illustrative servo pattern shown in FIGS. 3 and 4 includes the determination of inboard bias current (inboard $I_{bias}$) (block 52), the determination of outboard bias current (outboard $I_{bias}$) (block 54) (e.g., an outboard bias current for each of upper and lower outboard servo tracks 152, 154), the determination of outboard record current (outboard $I_{record}$) (block 56) (e.g., an outboard bias current for each of upper and lower outboard servo tracks 152, 154), and the determination of inboard record current (inboard $I_{record}$) (block 58). Upon determination of such drive currents, they are employed for bias recording of the servo pattern as shown in block 60. The illustrative determination of the drive currents shall be described using the graphical illustrations of FIGS. 7A–7D. One skilled in the art will understand that variations of such a determination and other methods of determining the drive currents may be used according to the present invention.

Figure 7A:
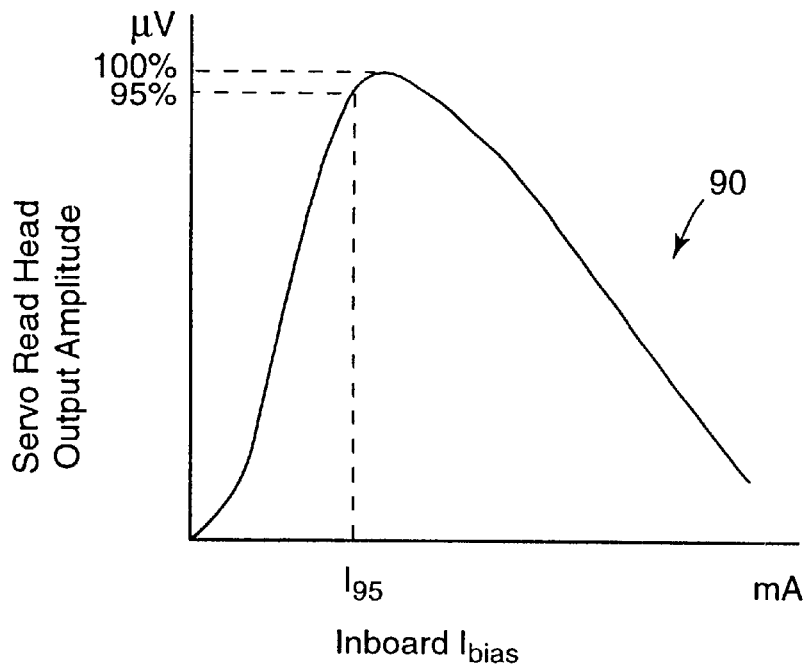
FIGS. 7A–7D are curves for use in illustrating the selection of various drive currents used in the bias recording of servo patterns according to the present invention as described in the method of FIG. 5.

Generally, inboard $I_{bias}$ is selected (block 52) to be slightly over the current that yields peak output amplitude with inboard $I_{record}$ set to a typical operating level. For example, as illustrated in FIG. 7A, a plurality of servo patterns are written using an inboard $I_{record}$ that is set near a typical operating current and a corresponding plurality of bias currents for the inboard servo track. Preferably, the outboard $I_{bias}$ and $I_{record}$ are turned off. As shown in the curve of FIG. 7A, a servo read system (e.g., servo read system 64 with the fixed servo read elements 168, 169 spaced a distance apart such as about 80 μm) as shown in FIG. 6, is used to measure servo read output amplitude for the plurality of servo patterns written using the varying plurality of bias currents. An inboard $I_{bias}$ is selected as a function of the peak servo read head output amplitude measured for the servo patterns. For example, as shown in the curve 90 of FIG. 7A, it is desired that 95% of peak output be used to determine the inboard $I_{bias}$ because the current measurement is more repeatable below peak than at peak due to measurement noise interacting with the slope of the curve. Other amplitudes such as 80% could also be used but would affect the factor set forth below. Preferably, a percentage in the range of about 80% to about 95% is used, however, a percentage in the range of about 50% to about 100% may also be used. For illustration, a point representing 95% servo read head output is shown on the curve 90 of FIG. 7A and is projected to the x-axis to select a corresponding 95% output bias current.

Thereafter, the 95% output bias current, e.g., the current representative of 95% servo read head output, is multiplied by a factor that leads to a reduction in servo errors, such as tracking rate errors and tracking error warnings. Such a factor multiplication results in an inboard $I_{bias}$ that is selected to be slightly over the current that yields peak output amplitude with inboard $I_{record}$ set to a typical operating level, e.g., the peak amplitude is obtained at about 1.1 times the current at 95% of peak output. For example, the factor used to calculate the inboard $I_{bias}$ depends on the characteristics of the write head used for writing the servo pattern. For example, generally the factor lies in the range of about 1.1 to about 2.0. For example, the factor may be about 1.15 for an IBM 3590 thin film head, slightly beyond the output amplitude peak. Yet further, for example, the factor may be 1.5 for a MIG ferrite head for writing 3590, which overbiases the head and reduces the output amplitude. As such, in this illustrative embodiment, the inboard $I_{bias}$ is set based on peak servo read head output, e.g., 95% output bias current, multiplied by an error reducing factor chosen based on the write head used to record the servo patterns.

Figure 7B:
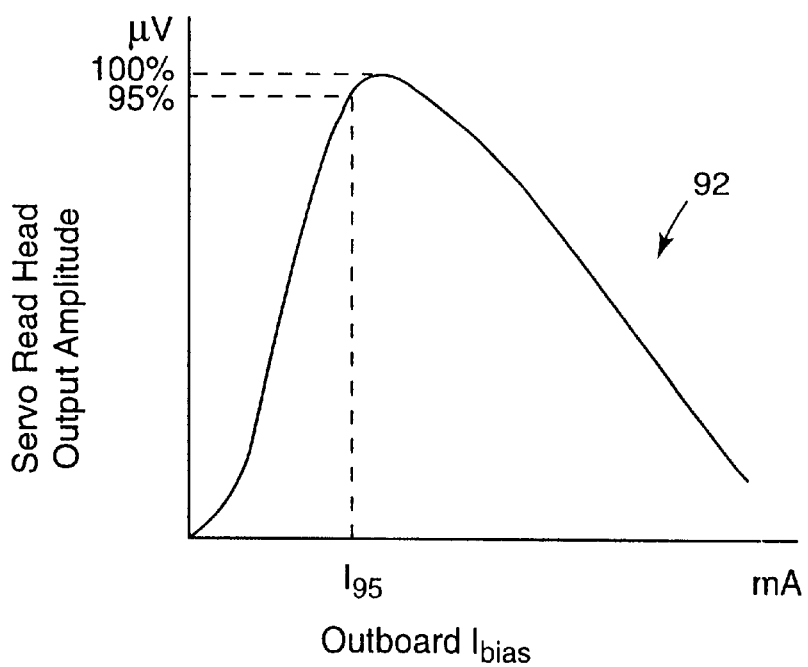

Next, a determination of outboard $I_{bias}$ (block 54) is carried out. One determination is made for an upper outboard $I_{bias}$ and also one determination is performed for a lower outboard $I_{bias}$, however, only description with respect to one is set forth herein as the other is performed in substantially the same manner. With the inboard $I_{bias}$ set to its operating point as previously determined, with the inboard $I_{record}$ turned off, and with the outboard $I_{record}$ for the upper outboard servo track set near its typical operating point, several servo patterns are written using a plurality of outboard bias currents as represented along the x-axis of the graph 92 shown in FIG. 7B. Thereafter, the servo read head output amplitudes are measured for the servo patterns written with the varied bias currents and an outboard $I_{bias}$ is determined as a function of the peak servo read head output in a manner similar to that described with reference to selection of inboard $I_{bias}$. For example, as shown in FIG. 7B, a 95% output bias current is selected. Thereafter, the 95% output bias current is multiplied by a factor to reduce servo errors to determine the upper outboard $I_{bias}$. Once again the factors used to calculate the operating upper outboard $I_{bias}$ depends on head type. For example, the range of factors may be between about 1.1 to about 2.0. Further, for example, the factors used may be 1.15 for an IBM 3590 head, with the factor being about 1.5 for a MIG ferrite head on 3590 media. Thereafter, the lower outboard $I_{bias}$ is determined in a like manner.

After determination of the inboard $I_{bias}$ and outboard $I_{bias}$ for both upper and lower outboard servo tracks, the outboard $I_{record}$ is determined (block 56), e.g., one $I_{record}$ for the upper outboard servo track and one $I_{record}$ for the lower outboard servo track. The outboard record currents ($I_{record}$) are set up to match the servo read head output amplitude for a particular outboard $I_{record}$ to a target servo read head output amplitude for a reference tape, e.g., such as the target amplitude shown in FIG. 7C. The outboard target output amplitude is set as a fraction of the target amplitude for the combined signals, i.e., the combined outboard and inboard signals read from the outboard and inboard servo tracks of the servo pattern. The target amplitudes for both the upper and lower outboard servo tracks is based on these fractions multiplied by a corresponding reference tape amplitude target.

Figure 7C:
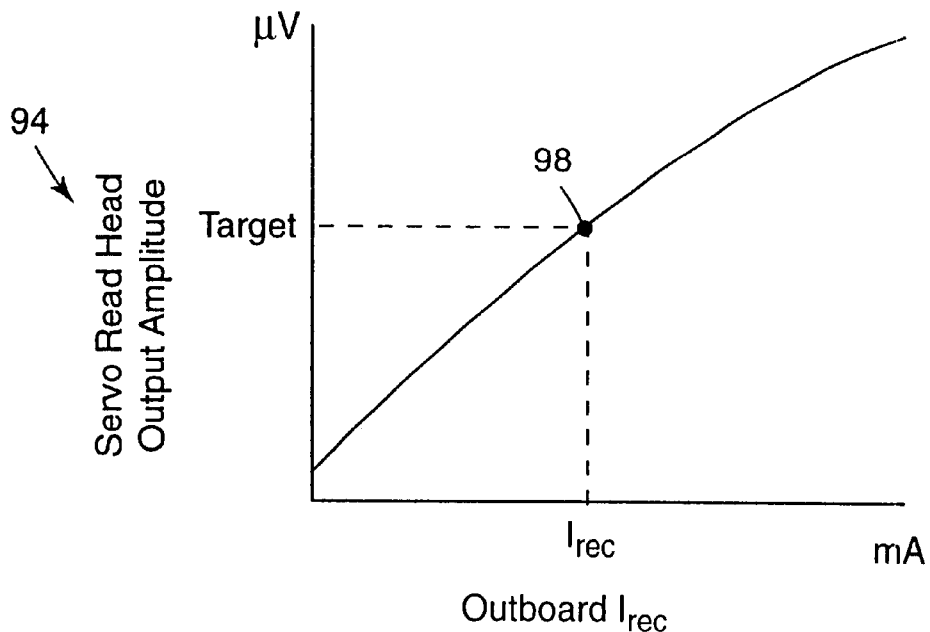

The setting of such target output amplitudes, e.g., the target output shown in FIG. 7C, is illustratively described as follows although various other manners of arriving at such values may also be used according to the present invention. First, upper and lower fractions are determined. The fractions are used to compensate for differences in amplitude caused by variations in head height. Such fractions are determined using a reference tape and a tape written with a servo pattern using an inboard bias current and inboard record current set to predetermined levels that result in a reasonable signal output that can be detected by upper and lower read elements 168 and 169 with the outboard bias and record currents are set to zero. Therefore, each servo read element 168, 169 reads about ½ of the signal recorded in the inboard servo track 150 and produces a corresponding output representative thereof.

The reference tape provides target output amplitude for both the upper (i.e., target upper output amplitude) and lower (i.e., target lower output amplitude) servo tracks 152, 154. The measured values from tape written with the servo pattern include measured output amplitudes for both the upper (i.e., measured upper output amplitude) and lower (i.e., measured lower output amplitude) servo tracks 152, 154. The fractions can then be generated as follows: Upper fraction=(measured lower output amplitude/target lower output amplitude)/((measured lower output amplitude/target lower output amplitude)+(measured upper output amplitude/target upper output amplitude)); Lower fraction=(measured upper output amplitude/target upper output amplitude)/ ((measured upper output amplitude/target upper output amplitude)+(measured lower output amplitude/target lower output amplitude)). With the fractions determined, the outboard upper and lower output targets (e.g., such as shown in FIG. 7C) can be determined by multiplying the respective fraction times the corresponding reference tape target output amplitudes.

With the target output amplitudes (e.g., such as shown in FIG. 7C) set for the upper and lower outboard servo tracks 152, 154, then the outboard $I_{record}$ can be determined, e.g., one $I_{record}$ for the upper outboard servo track and one $I_{record}$ for the lower outboard servo track. With inboard $I_{record}$ turned off and inboard $I_{bias}$ and outboard $I_{bias}$ set to their operating levels as determined above, servo patterns are written for a plurality of outboard $I_{record}$ as shown along the x-axis of the graph 94 of FIG. 7C. The target output amplitude 98 is then used to select a particular outboard $I_{record}$ to obtain such a target servo read output level. This is performed once for the upper servo track 152 and once for the lower servo track 154.

Although the above method generates two fractions which are used to set the outboard $I_{record}$, other methods may be used to generate such currents. Further, the two fractions generated may be adjusted by a multiplier to provide further compensation as needed. Generally, the fractions are used to compensate for differences in amplitude caused by variations in write head height.

When a common bias current (e.g., a common bias current used to record both the inboard and outboard servo tracks 150, 152, and 154) or a common record current (e.g., a common record current used to record both the outboard outboard servo tracks 152 and 154) is used for multiple gaps for recording multiple servo tracks, the common currents can be determined by determining such currents for each of the tracks to be recorded and then averaging the currents to determine the common current. For example, to determine a common outboard record current $I_{record}$ for recording both the upper and lower outboard servo tracks 152 and 154, the individual drive currents for each of the upper and lower outboard servo tracks 152, 154 are determined and then averaged to obtain a common outboard record current $I_{record}$ for use in recording such servo tracks.

Figure 7D:
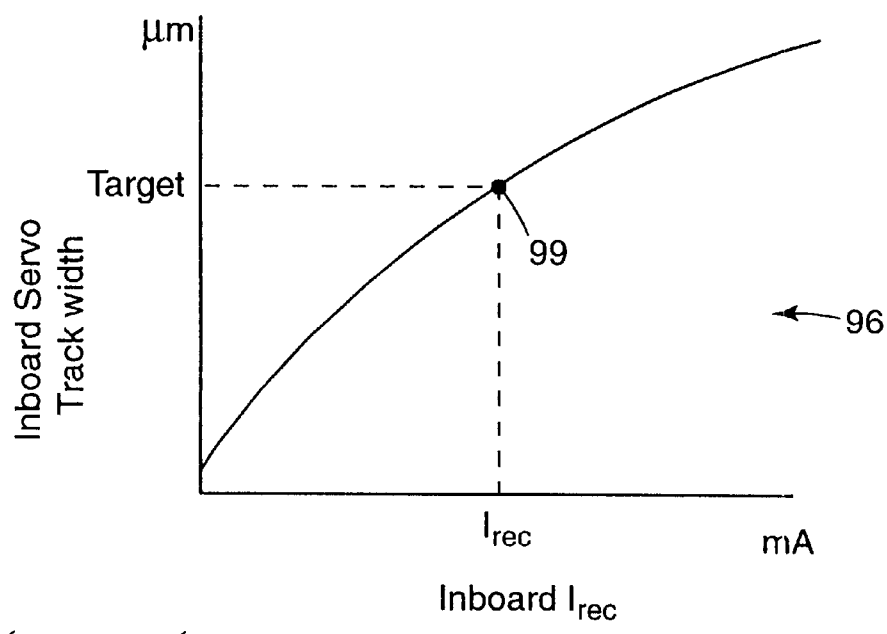

After the outboard $I_{record}$ (e.g., one $I_{record}$ for upper servo track 152 and one $I_{record}$ for lower servo track 154) has been established (block 56), then the inboard $I_{record}$ is determined (block 58). The inboard $I_{record}$ is set to match track width to a reference or target track width 99 of a reference tape as shown in the graph of FIG. 7D. With all the previously determined currents (i.e., outboard $I_{bias}$, inboard $I_{bias}$, and outboard $I_{record}$) set to their operating levels, inboard $I_{record}$ is swept (as shown in the x-axis of graph 96 of FIG. 7D) to record a plurality of corresponding servo patterns. The inboard track width for patterns corresponding to the plurality of the inboard $I_{record}$ is measured and an inboard $I_{record}$ is chosen which will achieve the desired target track width.

The inboard track width is measured by measuring the position of each of the servo track edges 181, 183 and then determining the inboard track width therefrom as perceived by the read head 66. The positions of the servo track edge 183 for each of the plurality of servo patterns can be measured as a function of the amplitude of the servo signal of the bursts in track 150 and the signal in track 154 as read by the servo read head 169, with the servo read head 169 in a fixed position substantially aligned with the servo track edge 183. Likewise, positions of the servo track edge 181 for each of the plurality of servo patterns can be measured as a function of the amplitude of the servo signal of the bursts in track 150 and the signal in track 152 as read by the servo read head 168, with the servo read head 168 in a fixed position substantially aligned with the servo track edge 181. For example, the amplitudes can be used with a look up table to provide positions of the servo track edges 181, 183 as perceived by the servo read heads 168, 169, respectively. It will be noted that the positions measured are not the actual physical position of the servo track edge, but rather are the perceived position of the servo track edges 181, 183 measured as a function of the amplitude of signal at the read heads 168, 169. Inboard servo track width can then be determined from the positions of the servo track edges 181, 183, for example, by determining a difference between the two measured positions.

Preferably, first a rough operating inboard $I_{record}$ is interpolated from the measured data. Then, additional samples near the rough operating inboard $I_{record}$ are recorded, measured, and used to find the inboard $I_{record}$ current that matches the track width thereof to the target value.

Figure 8:
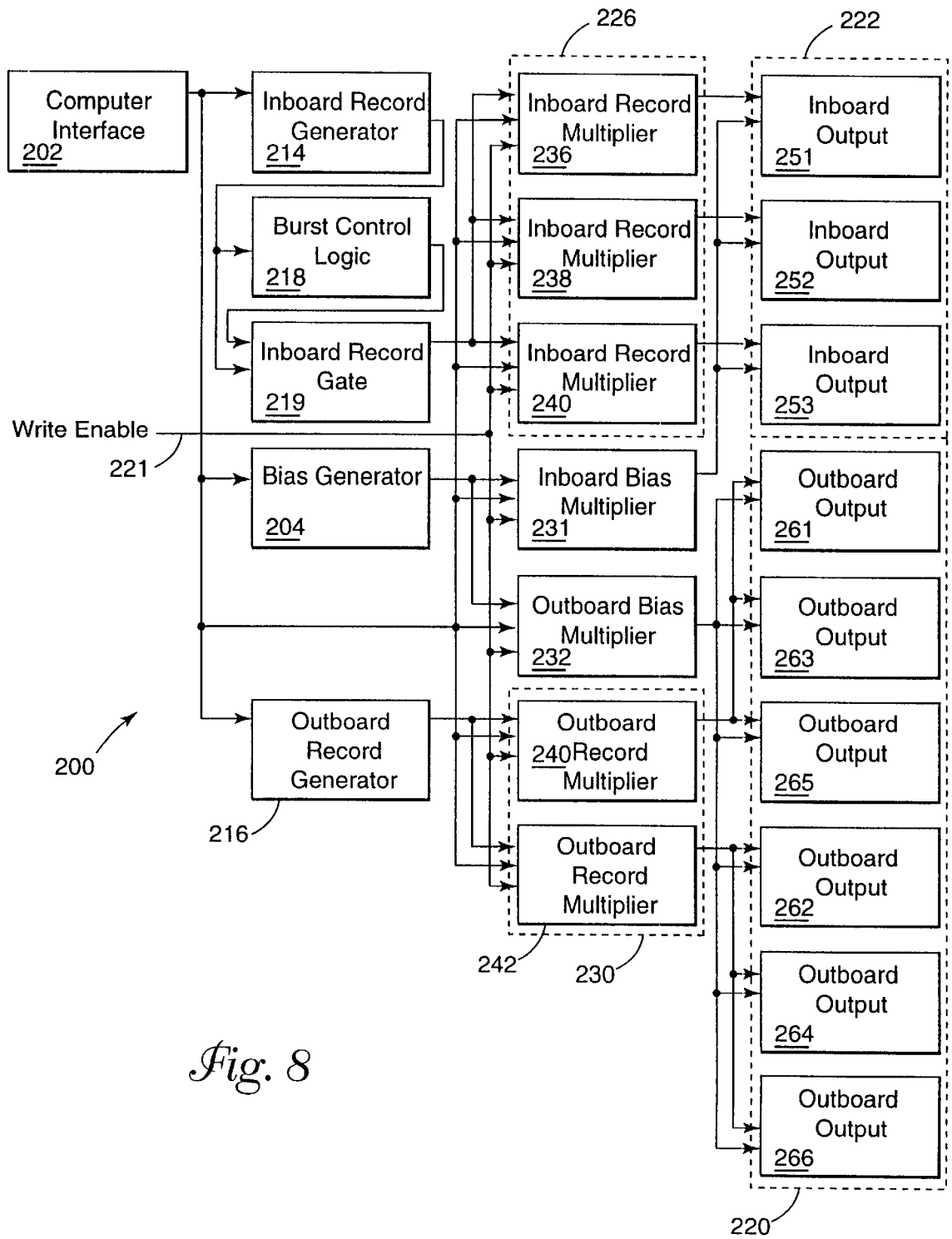
FIG. 8 is a simplified block diagram of one illustrative embodiment of a write driver for writing the servo pattern shown on the magnetic tape of FIGS. 3 and 4.

With the drive currents determined, they are then employed in the bias recording process (block 60) to write a servo pattern as shown in FIG. 3 using a tape servo recording system 10 as shown in FIG. 1. Generally, such a bias recording process shall be described with reference to FIG. 8 which shows one illustrative embodiment of a write driver 200 which may be employed as the write driver 16 in the general tape servo record system 10 according to the present invention. The write driver 200 includes circuitry for driving write elements for recording all three of the servo bands 122, 124, 126.

The illustrative write driver 200 includes a computer interface 202; three frequency generators 204, 214, and 216; burst control logic 218 and inboard record gate 219 for controlling the recording of bursts in the inboard servo track 150; multipliers 226, 230, 231, 232 for multiplying signal amplitudes as required; inboard output drive circuits 222 for driving write elements (e.g., write element 187) to record inboard servo tracks (e.g., inboard servo track 150) in the servo bands 122, 124, 126; and outboard output drivers 220 for driving write elements (e.g., write elements 86, 188) for recording outboard servo tracks (e.g., outboard servo tracks 152, 154) in the servo bands 122, 124, 126.

Computer interface 202 is provided for receiving control signals from control unit 14 and providing appropriate control signals to other circuitry of write driver 200. For example, computer interface 202 controls generation of signals by inboard record frequency generator 214 and outboard record frequency generator 216 for generation of inboard and outboard record currents, respectively, and also controls generation of signals by bias frequency generator 204 for use in generating inboard and outboard bias currents. The write driver 200 is enabled by application of an enable signal to write enable line 221 by the control unit 14.

In operation, to record inboard servo tracks of the servo bands 122, 124, and 126 (e.g., inboard servo track 150 as shown in FIG. 4), inboard record frequency generator 214 applies a first signal to burst control logic 218 and also to inboard record gate 219. Burst control logic 218 is used to control inboard record gate 219 such that bursts of the output frequency signal generated by inboard record frequency generator 214 are applied to the inboard record multipliers 226.

Inboard record multipliers 226 include inboard record multiplier 236 for use in generating an inboard record current for use in recording an inboard servo track 150 in servo band 122; with inboard record multipliers 238, 240 for use in recording inboard servo tracks in servo bands 124 and 126, respectively. As such, each of these inboard servo track drive currents can be multiplied by an independent separate multiplier to obtain a desirable signal amplitude as determined in accordance with the method for determining inboard record currents described previously herein. Such independent adjustment of each inboard servo track current allows for reducing the effects of amplitude and track width deviations of the write head.

The output of the inboard record multipliers 226 is applied to respective inboard output drivers 222. For example, the output of inboard record multiplier 236 is applied to inboard output driver 251, the inboard record multiplier output 238 is applied to inboard output driver 252, and inboard record multiplier output 240 is applied to inboard output driver 253.

Each of the inboard output drivers 251–253 also have a continuous inboard bias signal applied thereto for summing with the inboard record signal. Under control of computer interface 202, bias frequency generator 204 applies a bias signal to inboard bias multiplier 231 and outboard bias multiplier 232. The inboard bias multiplier 231 controls the amplitude of the signal and provides an output representative of the desired, preferably continuous, inboard bias current to each of the inboard output drivers 251–253 to be summed with the burst outputs of the inboard record multipliers 226. As such, the inboard output drivers 251–253 sum the inboard record signal and, the preferably continuous, inboard bias signal to drive respective write elements to write the inboard servo tracks within the servo bands 122, 124, 126 of magnetic tape 120 with bursts of signal as illustrated in inboard servo track 150 shown in FIG. 4.

Likewise, computer interface 202 controls the generation of a second signal from outboard record frequency generator 216 which is applied to outboard record multipliers 230. Outboard record multipliers 230 include outboard record multiplier 240 and outboard record multiplier 242. Each of the outboard record multipliers 240, 242 is for controlling the signal amplitude of outboard record signals to be used in writing either the upper or lower outboard servo tracks within the servo bands 122, 124, 126. For example, outboard record multiplier 240 is used to record the upper outboard servo track 152 of servo band 122 and likewise the upper outboard servo track of the other respective servo bands 124, 126. Likewise, the output of the outboard record multiplier 242 is used to write the lower outboard servo tracks of the respective servo bands 122, 124, 126 (e.g., lower outboard servo track 154 of servo band 122). The outputs of the output record multipliers 240, 242 are applied to output drivers 220 which include drivers 261–266. The output of outboard bias multiplier 232 is also provided to the plurality of outboard output drivers 220 to be summed with the outboard record multiplier outputs. As such, each outboard output driver 220 receives an outboard bias signal from outboard bias multiplier 232 and an outboard record current from either outboard record multiplier 240 or outboard record multiplier 242. Outboard output drivers 261, 262 then provide the summed outboard bias and record currents to record the upper and lower outboard servo tracks 152, 154 within servo band 122. Likewise, outboard output drivers 263–264 are used to drive write elements of write head 18 to write upper and lower outboard servo tracks within servo band 124, and outboard output drivers 265–266 are used to write the outboard servo tracks in servo band 126.

One skilled in the art will recognize that various other configurations for the write driver 16 may be employed according to the present invention and that driver 200 is but one illustrative embodiment of such a driver. For example, various different configurations may be used for summing bias signals with record signals for writing servo tracks by bias recording. Further, for example, multiple bias generators may be used to generate inboard and outboard bias currents as opposed to use of the single bias generator 204; multiple inboard record frequency generators and multiple outboard record frequency generators may be used for use in generating currents for recording the various inboard and outboard servo tracks as opposed to the single inboard record frequency generator 214 and single outboard record frequency generator 216; and additional multipliers may be used for providing more precise outputs to the inboard and outboard output drivers 220, 222, e.g., each outboard record multiplier 240, 242 could be replaced by three separate multipliers corresponding to the outboard output drivers 262–266.

Further, the inboard record frequency generator, the outboard record frequency generator, the bias generator, or any other signal generators described herein may be used to generate any substantially periodic signal that is suitable for use according to the present invention. For example, as described herein, sine wave signals have been generated for use in the bias recording of the servo tracks as described with reference to FIG. 4. However, any substantially periodic signals may be used according to the present invention, e.g., sine wave, square wave, etc.

Yet further, one skilled in the art will recognize that the servo patterns described herein may be recorded using one or more passes of the tape across the servo writer. However, preferably, the servo pattern is written in a single pass. With use of a multiple pass recording system, less write elements, e.g., write gaps, may be required for writing multiple servo band tapes. For example, the same write element may be in first position to record an inboard servo track, may be in a second position to record an outboard servo track, and may be in a third position to record another outboard servo track.

All patents and references cited herein are incorporated in their entirety as if each were incorporated separately. This invention has been described with reference to illustrative embodiments and is not meant to be construed in a limiting sense. As described previously, one skilled in the art will recognize that various other illustrative servo patterns may be written with bias recording to gain the advantages as described herein. Further, various modifications of the illustrative embodiments, as well as additional embodiments of the invention, will be apparent to persons skilled in the art upon reference to this description.

What is claimed is:

1. A servo pattern recording method, comprising:
providing at least one servo band along at least a portion of a length of a tape;
recording bursts of a first signal in a first servo track of the servo band along the length of the tape; and
recording a second signal in at least a second servo track of the servo band along the length of the tape, wherein the second servo track is recorded adjacent to the first servo track, and further wherein at least one of the first signal and the second signal is recorded using a bias signal at a bias frequency summed with a record signal at a record frequency.

2. The method of claim 1, wherein recording the bursts in the first servo track includes recording the bursts using a first bias signal at a first bias frequency summed with bursts of a first record signal at a first record frequency; and further wherein recording the second signal in at least the second servo track includes recording the second signal using a second bias signal at a second bias frequency summed with a second record signal at a second record frequency, wherein the first record frequency and the second record frequency are different.

3. The method of claim 2, wherein the first bias signal is a continuous first bias signal.

4. The method of claim 2, wherein the second signal is a continuous signal.

5. The method of claim 4, wherein recording the bursts in the first servo track includes driving a first write element in a first position with a first servo track write current that is a summation of a first servo track bias current and a first servo track record current, and wherein recording the continuous second signal in at least the second servo track includes driving a second write element in a second position with a second servo track write current that is a summation of a second servo track bias current and a second servo track record current.

6. The method of claim 5, wherein the method further includes determining the first servo track bias current, and further wherein determining the first servo track bias current includes:
measuring servo read output amplitude for a plurality of servo patterns written using a plurality of first servo track bias currents with the first servo track record current, the second servo track bias current, and second servo track record current set to predetermined current levels; and
selecting the first servo track bias current as a function of peak servo read output amplitude of the measured servo read output amplitudes.

7. The method of claim 5, wherein the method further includes determining the second servo track bias current, and further wherein determining the second servo track bias current includes:
measuring servo read output amplitude for a plurality of servo patterns written using a plurality of second servo track bias currents with the second servo track record current, the first servo track record current, and the first servo track bias current set to predetermined current levels; and
selecting the second servo track bias current as a function of peak servo read output amplitude of the measured servo read output amplitudes.

8. The method of claim 5, wherein the method further includes determining the second servo track record current as a function of a target servo read output amplitude.

9. The method of claim 8, wherein determining the second servo track record current as a function of a target servo read output amplitude includes:
measuring servo read output amplitude for a plurality of servo patterns written using a plurality of second servo track record currents with the first servo track record current, the first servo track bias current, and the second servo track bias current set to predetermined current levels; and
selecting the second servo track record current as a function of the measured servo read output amplitudes compared to the target servo read output amplitude.

10. The method of claim 5, wherein the method further includes determining the first servo track record current as a function of at least one target servo track edge position.

11. The method of claim 10, wherein determining the first servo track record current as a function of at least one target servo track edge position includes:
measuring servo track edge positions for a plurality of servo patterns written using a plurality of first servo track record currents with the second servo track record current, the first servo track bias current, and the second servo track bias current set to predetermined current levels; and
selecting the first servo track record current as a function of the measured servo track edge positions compared to the target servo track edge position.

12. The method of claim 4, wherein recording the bursts in the first servo track includes recording the bursts in an inboard servo track of the servo band using an inboard bias signal at an inboard bias frequency summed with bursts of an inboard record signal at an inboard record frequency, wherein recording the continuous second signal in at least the second servo track includes recording the continuous second signal in two outboard servo tracks of the servo band using an outboard bias signal at an outboard bias frequency summed with an outboard record signal at an outboard record frequency, and further wherein the two outboard servo tracks are adjacent opposing edges of the inboard servo track.

13. A servo pattern recording method, comprising:
providing at least one servo band along at least a portion of a length of a tape;
recording bursts of a first signal in at least one inboard servo track of the servo band using an inboard bias signal at an inboard bias frequency summed with bursts of an inboard record signal at an inboard record frequency; and
recording a continuous second signal in each of at least first and second outboard servo tracks of the servo band, each continuous second signal recorded using an outboard bias signal at an outboard bias frequency summed with an outboard record signal at an outboard record frequency, wherein at least the first outboard servo track is adjacent a first edge of the at least one inboard servo track along the length of the tape and at least the second outboard servo track is adjacent a second edge of the at least one inboard servo track along the length of the tape.

14. The method of claim 13, wherein recording the bursts of the first signal in the at least one inboard servo track includes driving a first write element with an inboard current that is a summation of an inboard bias current and an inboard record current, and wherein recording the continuous second signal in each of the at least first and second outboard servo tracks includes driving second write elements with outboard currents that are a summation of an outboard bias current and an outboard record current.

15. The method of claim 14, wherein the method further includes determining the inboard bias current, and further wherein determining the inboard bias current includes:
measuring servo read output amplitude for a plurality of servo patterns written using a plurality of inboard bias currents with the inboard record current, the outboard bias current, and the outboard record current set to predetermined current levels; and
selecting the inboard bias current as a function of peak servo read output amplitude of the measured servo read output amplitudes.

16. The method of claim 14, wherein the method further includes determining the outboard bias current, and further wherein determining the outboard bias current includes:
measuring servo read output amplitude for a plurality of servo patterns written using a plurality of outboard bias currents with the outboard record current, the inboard record current, and the inboard bias current set to predetermined current levels; and
selecting the outboard bias current as a function of peak servo read output amplitude of the measured servo read output amplitudes.

17. The method of claim 14, wherein the method further includes determining the outboard record current as a function of a target servo read output amplitude.

18. The method of claim 17, wherein determining the outboard record current as a function of a target servo read output amplitude includes:

measuring servo read output amplitude for a plurality of servo patterns written using a plurality of outboard record currents with the inboard record current, the inboard bias current, and the outboard bias current set to predetermined current levels; and selecting the outboard record current as a function of the measured servo read output amplitudes compared to the target servo read output amplitude.

19. The method of claim 14, wherein the method further includes determining the inboard record current as a function of a target inboard servo track width.

20. The method of claim 19, wherein determining the inboard record current as a function of a target inboard servo track width includes:

measuring inboard servo track width for a plurality of servo patterns written using a plurality of inboard record currents with the outboard record current, the inboard bias current, and the outboard bias current set to predetermined current levels; and selecting the inboard record current as a function of the measured inboard servo track widths compared to the target inboard servo track width.

21. A servo pattern recording system, the system comprising:

one or more write elements;

a bias frequency generator operable to generate at least one bias frequency signal;

an inboard frequency generator operable to generate at least one inboard frequency signal;

an outboard frequency generator operable to generate at least one outboard frequency signal;

amplitude control circuitry operable to modify the amplitude of the at least one bias frequency signal, the at least one inboard frequency signal, and the at least one outboard frequency signal;

burst control logic circuitry connected to the inboard frequency generator to provide for burst inboard frequency signals therefrom; and control circuitry, wherein the control circuitry is operable to control the application of a bias frequency signal modified by the amplitude control circuitry and the application of burst inboard frequency signals modified by the amplitude control circuitry to at least a first output drive circuit to drive at least one of the write elements to record bursts of a first signal in at least one inboard servo track of at least one servo band along at least a portion of a length of a tape, and further wherein the control circuitry is operable to control the application of a bias frequency signal modified by the amplitude control circuitry and the application of an outboard frequency signal modified by the amplitude control circuitry to at least a second output drive circuit to drive at least one of the write elements to record a continuous second signal in at least first and second outboard servo tracks of the servo band, wherein at least the first outboard servo track is adjacent a first edge of the at least one inboard servo track along the length of the tape and at least the second outboard servo track is adjacent a second edge of the at least one inboard servo track along the length of the tape.

22. A servo pattern recording system for recording a servo pattern in at least one servo band along at least a portion of a length of a tape, the system comprising:

means for recording bursts of a first signal in a first servo track of the servo band along the length of the tape; and means for recording a second signal in at least a second servo track of the servo band along the length of the tape, wherein the second servo track is recorded adjacent to the first servo track, and further wherein at least one of the first signal and the second signal is recorded using a bias signal at a bias frequency summed with a record signal at a record frequency.

23. The system of claim 22, wherein the means for recording the bursts in the first servo track includes means for recording the bursts using a first bias signal at a first bias frequency summed with bursts of a first record signal at a first record frequency; and further wherein the means for recording the second signal in at least the second servo track includes means for recording the second signal using a second bias signal at a second bias frequency summed with a second record signal at a second record frequency, wherein the first record frequency and the second record frequency are different.

24. The system of claim 23, wherein the means for recording the bursts using a first bias signal at a first bias frequency summed with a first record signal at a first record frequency includes means for recording the bursts using a continuous first bias signal at a first bias frequency summed with a first record signal at a first record frequency.

25. The system of claim 23, wherein the means for recording the second signal includes means for recording a continuous signal.

26. The system of claim 25, wherein the means for recording the bursts in the first servo track includes a driver for driving a write element with a first servo track write current that is a summation of a first servo track bias current and a first servo track record current, and wherein the means for recording the continuous second signal in at least the second servo track includes a driver for driving a write element with a second servo track write current that is a summation of a second servo track bias current and a second servo track record current.

* * * * *